US008523191B2

(12) United States Patent
Yagiela

(10) Patent No.: US 8,523,191 B2
(45) Date of Patent: Sep. 3, 2013

(54) HEIGHT CONTROL VALVE ASSEMBLY FOR AXLE/SUSPENSION SYSTEMS

(75) Inventor: Michael W. Yagiela, North Canton, OH (US)

(73) Assignee: Hendrickson USA, LLC, Itasca, IL (US)

( * ) Notice: Subject to any disclaimer, the term of this patent is extended or adjusted under 35 U.S.C. 154(b) by 0 days.

(21) Appl. No.: 13/517,890

(22) Filed: Jun. 14, 2012

(65) Prior Publication Data

US 2012/0319366 A1    Dec. 20, 2012

Related U.S. Application Data

(60) Provisional application No. 61/496,734, filed on Jun. 14, 2011.

(51) Int. Cl.
*B60G 11/26* (2006.01)
*B60G 17/056* (2006.01)

(52) U.S. Cl.
USPC .............. 280/5.514; 280/6.157; 280/124.157

(58) Field of Classification Search
CPC ...... B60G 11/26; B60G 11/27; B60G 17/056; B60G 17/0565; B60G 2400/25; B60G 2400/252; F16C 11/04
USPC ....... 280/5.514, 6.15, 6.157, 6.159, 124.116, 280/124.128, 124.157, DIG. 1; 16/2.1; 248/56; 403/186, 187, 188, 192, 194; 267/DIG. 1
See application file for complete search history.

(56) References Cited

U.S. PATENT DOCUMENTS

| 2,962,296 | A | * | 11/1960 | Jackson et al. | 280/5.514 |
| 2,967,064 | A | | 1/1961 | Valentine | |
| 2,989,983 | A | | 6/1961 | Valentine | |
| 3,036,844 | A | * | 5/1962 | Vogel | 267/64.19 |
| 3,092,397 | A | * | 6/1963 | Dullabaun et al. | 280/6.158 |
| 3,145,032 | A | * | 8/1964 | Turek | 280/124.157 |
| 3,480,293 | A | * | 11/1969 | Palmer et al. | 180/41 |
| 3,768,115 | A | * | 10/1973 | Hoffmann et al. | 16/2.1 |
| 4,088,356 | A | * | 5/1978 | Jeavons | 292/359 |
| 4,181,337 | A | * | 1/1980 | Muller | 292/271 |
| 4,614,247 | A | * | 9/1986 | Sullivan | 180/24.02 |
| 4,630,330 | A | * | 12/1986 | Keller et al. | 16/2.1 |
| 5,353,988 | A | * | 10/1994 | Gallenberg | 239/164 |
| 5,560,591 | A | | 10/1996 | Trudeau et al. | |
| 5,651,555 | A | | 7/1997 | O'Reilly et al. | |
| 5,855,447 | A | * | 1/1999 | Nemoto | 403/122 |
| 5,860,450 | A | * | 1/1999 | Trudeau et al. | 137/627.5 |
| 5,902,050 | A | * | 5/1999 | Balczun et al. | 384/206 |

(Continued)

Primary Examiner — Joseph Rocca
(74) Attorney, Agent, or Firm — Dureska, Kennedy & Moore, LLC; David P. Dureska; Brent L. Moore

(57) ABSTRACT

A height control valve assembly for an axle/suspension system of a vehicle includes a height control valve in fluid communication with a compressed air source, with at least one air spring of said vehicle, and with atmosphere. The height control valve is attached to the frame of the vehicle and includes a flow control means for regulating fluid flow through the valve. A control arm is operatively attached to the flow control means, whereby movement of the control arm regulates fluid flow through the height control valve. The height control valve assembly further includes a link having a first end and a second end. The first end of the link is operatively attached to the control arm. The second end of the link is attached to the beam of the axle/suspension system, such that the ends of the link are generally vertically aligned.

7 Claims, 12 Drawing Sheets

(56) References Cited

U.S. PATENT DOCUMENTS

| | | | |
|---|---|---|---|
| 6,035,457 A | 3/2000 | Krause, Jr. | |
| 6,036,200 A * | 3/2000 | Kim | 280/5.506 |
| 6,076,840 A * | 6/2000 | Kincaid et al. | 280/124.107 |
| 6,089,551 A | 7/2000 | Haviland et al. | |
| 6,431,557 B1 | 8/2002 | Terborn et al. | |
| 7,806,417 B1 * | 10/2010 | Hanser et al. | 280/5.514 |
| 2003/0038412 A1 | 2/2003 | Plath | |
| 2005/0110233 A1 | 5/2005 | Hedenberg | |
| 2007/0102895 A1 | 5/2007 | Pierce et al. | |
| 2009/0194179 A1 * | 8/2009 | Morris et al. | 137/625.11 |
| 2010/0213397 A1 * | 8/2010 | Trudeau et al. | 251/129.01 |
| 2012/0043735 A1 * | 2/2012 | Grauer et al. | 280/124.134 |

\* cited by examiner

FROM AIR RESERVOIR

HEIGHT CONTROL VALVE ASSEMBLY FOR AXLE/SUSPENSION SYSTEMS

CROSS-REFERENCE TO RELATED APPLICATION

This application claims the benefit of U.S. Provisional Patent Application Ser. No. 61/496,734, filed Jun. 14, 2011.

BACKGROUND OF THE INVENTION

1. Field of the Invention

The invention relates generally to the art of air-ride axle/suspension systems for heavy-duty wheeled vehicles, such as tractor-trailers or semi-trailers, which cushion the ride and stabilize the vehicle during operation. More particularly, the invention is directed to a height control valve assembly utilized in connection with air-ride axle/suspension systems. More specifically, the invention is directed to a height control valve and link that more efficiently connects the control arm of the height control valve to the beam of the air-ride axle/suspension system, eliminating the brackets and hardware typically associated with attaching the height control valve link to the frame of the vehicle and to the beam of the axle/suspension system. The height control valve assembly of the present invention results in fewer parts, reduced weight and more simplified installation of the height control valve and link, thereby reducing installation and maintenance cost, and reducing undesirable tolerance stacks associated with multiple bracket configurations prevalent in the prior art.

2. Background Art

Heavy-duty vehicles such as tractor-trailers typically include two or more leading or trailing arm suspension assemblies that connect the wheel bearing axles of the vehicle to the frame of the vehicle. Early suspension designs included heavy leaf-spring suspensions which resulted in a relatively rough ride to the cargo and/or passengers carried by the vehicle, and did not allow loads to equalize among the axles in all situations, thus creating the need for an axle/suspension system with softer ride characteristics and more efficient equalization characteristics. The subsequent development of air-ride axle/suspension systems provided greater load equalization among multiple axles for semi-trailers as well as improved ride quality for individual axles.

As a result, heavy-duty vehicles that transport freight often include leading or trailing arm air-ride axle/suspension systems, which use air springs to cushion the ride of the vehicle. Pneumatic control of these air springs is an important feature of air-ride axle/suspension systems. More particularly, it is important for a cushioned vehicle ride, and for optimum axle/suspension system performance and longevity to attempt to maintain a consistent predetermined distance between the vehicle frame and the travel surface. This predetermined distance is known in the art as the design ride height of the vehicle. The operating conditions of the vehicle must be considered in order to establish the design ride height of the vehicle. That is, when a heavy-duty vehicle executes certain maneuvers, such as making a hard turn or traveling over rough terrain, the forces imposed on the axle/suspension system by such maneuvers cause the axle/suspension system to articulate, or pivot and/or flex, beneath the vehicle frame which the system supports. Typically, an axle/suspension system is designed so that the anticipated range of articulation, pivoting and/or flexing occurs about a nominal predetermined position, and that nominal position is set as the design ride height of the vehicle. This articulation, pivoting and/or flexing can also be caused by the loading and unloading of the vehicle.

More specifically, after a heavy-duty vehicle is loaded with freight, or after freight is unloaded from the vehicle, the air springs of the axle/suspension system are adjusted to ensure that the vehicle is at design ride height. The adjustment of the air springs of the axle/suspension system is typically automatically accomplished by a height control valve assembly or leveling valve assembly which is in fluid communication with an air source and with the air springs. When the vehicle is loaded with freight and the air springs of the axle/suspension system are compressed, causing the vehicle frame to be positioned below design ride height or closer to the travel surface, compressed air is supplied to the air springs, thereby inflating/extending them and, in turn, causing the axle/suspension system to raise the vehicle frame to the design ride height. Conversely, when the vehicle is unloaded and the air springs of the axle/suspension system are extended, causing the vehicle frame to be positioned above design ride height or further away from the travel surface, air is exhausted from the air springs, thereby deflating/compressing them until the axle/suspension system lowers the vehicle frame to the design ride height.

To control the flow of air into the air springs, and the exhaustion of air from the air springs, a mechanically operated valve typically is employed, and is known in the art as a height control valve or leveling valve. The height control valve is typically mounted on a bracket that is in turn attached to the frame or hanger of the vehicle. The height control valve is in fluid communication with a compressed air source, such as an air supply tank, and is also in fluid communication with the vehicle air springs. The height control valve includes a control arm that is capable of being raised or lowered in order to direct air from the compressed air source to the air springs or alternatively from the air springs to atmosphere. The control arm is attached to a link that is bolted to the control arm on one end and bolted to a bracket at the other end. The bracket is in turn typically rigidly attached to the brake chamber mount of the brake assembly or to one of the beams of the axle/suspension system. The height control valve, along with the brackets and the link and the associated hardware that fastens these parts together, is known as the height control valve assembly. Adjustments to the height control valve assembly, including the link that controls activation of the valve, enable the design ride height to be achieved before the vehicle travels over the road.

Also, as the vehicle travels over the road and the driver executes maneuvers that cause the axle/suspension system to articulate between positions that compress the air springs and positions that extend them, the height control valve acts to maintain the design ride height. That is, when the air springs are compressed, the height control valve supplies air to the air springs from a vehicle air reservoir. Conversely, when the air springs are in an extended position, the height control valve exhausts air from the springs to atmosphere. The amount of air that is supplied or exhausted is based on the duration of the articulation and the flow rate of the height control valve at a given position.

Prior art height control valve assemblies often include links that are formed from metal plates having a plurality of aligned openings. The plates are attached to one another via fasteners that are disposed through selected ones of the aligned openings. By removing the fasteners and moving the plates in opposite directions with respect to one another and then replacing the fasteners, the length of the link can be increased or decreased. As a result, these types of prior art links are mechanically adjustable, which can potentially lead to improper adjustment of the ride height of the vehicle due to human error. Also, because prior art height control valve assemblies typically include brackets on the vehicle frame and brackets on the beam or brake chamber mount of the axle/suspension system that are distant from one another, the control arm of these prior art height control valve assemblies is quite long, resulting in a smaller range of activation, which can reduce performance of the height control valve. Moreover, because prior art height control valve assemblies include at least two brackets, one bracket attaching the height control valve to the vehicle frame or hanger, and the other bracket attaching the link of the height control valve to one of the beams or brake chamber mounts of the axle/suspension system, the combination of brackets and adjustable links make installation complicated, require increased maintenance and result in undesirable tolerance stacks that can potentially cause an inaccurate design ride height for the vehicle.

The height control valve assembly of the present invention solves the problems associated with prior art height control valve assemblies by utilizing a height control valve that mounts directly to the vehicle frame and which incorporates a non-adjustable wire link that attaches directly to one of the beams of the axle/suspension system, thereby eliminating all of the brackets and associated hardware of the prior art height control valve assemblies, resulting in easier installation, decreased maintenance costs and reduced weight. Moreover, because the brackets attaching the height control valve assembly to the frame or hanger and the beam are eliminated, the height control valve assembly of the present invention reduces undesirable tolerance stacks associated with those brackets, and thereby reduces the possibility of human error adversely affecting the design ride height of the vehicle. The height control valve assembly of the present invention also allows for utilization of a relatively shorter control arm, that in turn allows a wider range of activation for the height control valve, resulting in increased sensitivity and performance of the system.

SUMMARY OF THE INVENTION

Objectives of the present invention include providing a height control valve assembly that eliminates the brackets and hardware of prior art height control valve assemblies, resulting in easier installation, decreased maintenance costs and reduced weight.

A further objective of the present invention is to provide a height control valve assembly that reduces undesirable tolerance stacks associated with prior art height control assemblies, thereby reducing the possibility of human error adversely affecting the design ride height of the vehicle.

Yet another objective of the present invention is to provide a height control valve assembly that allows a wider range of activation for the height control valve, resulting in increased sensitivity and performance of the system.

Still another objective of the present invention is to provide a height control valve assembly that is generally not adjustable by the operator of the vehicle.

These objectives and advantages are obtained by the height control valve assembly of the present invention, which includes a height control valve mounted on a frame of the vehicle, the height control valve in fluid communication with a compressed air source, with at least one air spring of the vehicle, and with atmosphere. The height control valve includes flow control means for regulating fluid flow through the height control valve. A control arm is operatively attached to the flow control means, the control arm regulating fluid flow through the height control valve during operation of the vehicle. The height control valve further includes a link having a first end and a second end. The first end of the link is operatively attached to the control arm. The second end of the link is disposed through an opening formed in a beam of the axle/suspension system to attach the second end of the link to the beam.

BRIEF DESCRIPTION OF THE SEVERAL VIEWS OF THE DRAWINGS

The preferred embodiment of the present invention, illustrative of the best mode in which applicant has contemplated applying the principles, is set forth in the following description and is shown in the drawings, and is particularly and distinctly pointed out and set forth in the appended claims.

Similar numerals refer to similar parts throughout the drawings.

DESCRIPTION OF THE PREFERRED EMBODIMENT

Figure 1:
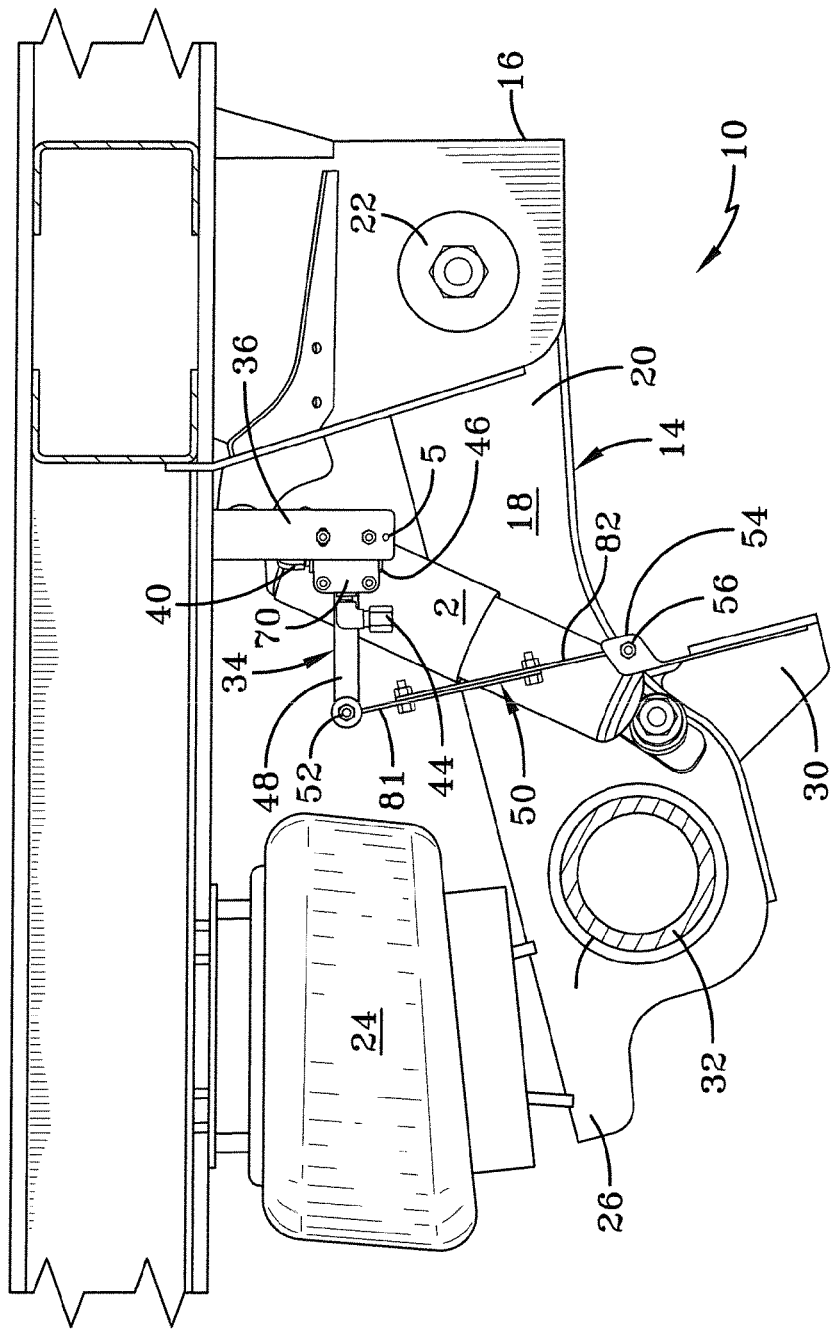
FIG. 1 is a fragmentary outboard elevational view of the driver side suspension assembly and an axle of an air-ride trailing arm beam-type axle/suspension system, and showing a prior art height control valve assembly.
Figure 1A:
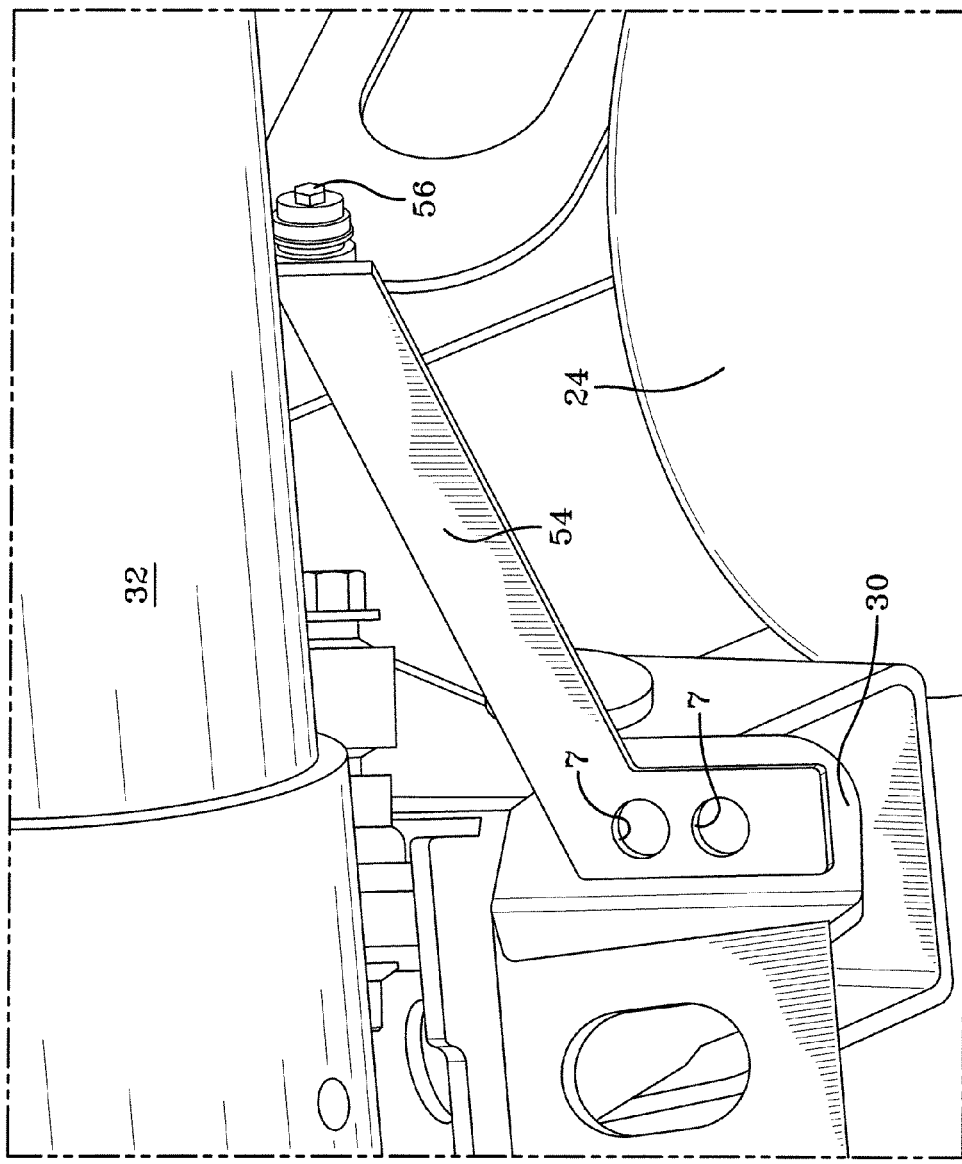
FIG. 1A is a fragmentary rear perspective view of the beam mounting bracket shown in FIG. 1.
Figure 1B:
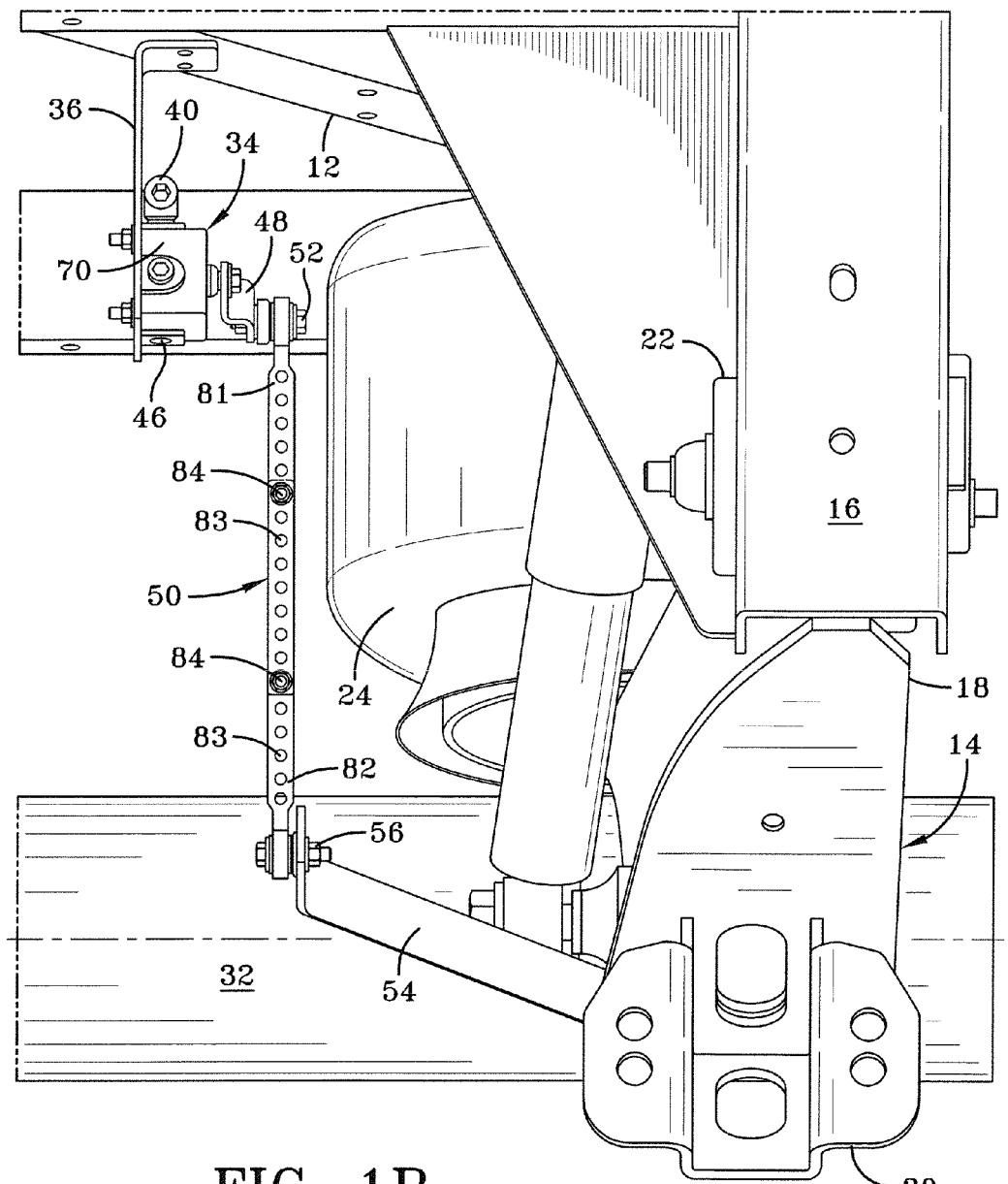
FIG. 1B is a fragmentary front perspective view of the prior art height control valve assembly shown in FIG. 1.

So that the structure and resulting advantages of the present invention can be better understood, a prior art height control valve assembly is shown in FIGS. 1 and 1B and indicated by numeral 34, and will now be described together with the environment in which it is utilized. It is important to note that an air-ride axle/suspension system 10, while shown as a trailing arm beam-type axle/suspension system, also includes other types of heavy-duty vehicle air-ride axle/suspension systems known to those skilled in the art, such as leading arm beam-type air-ride axle/suspension systems and air-ride axle/suspension systems having arms other than box beam-type, such as spring beams. It is also important to note that a vehicle frame 12 is generally representative of various types of frames commonly used for heavy-duty vehicles, including primary frames and/or floor structures that do not support a subframe, primary frames and/or floor structures that do support a subframe, and subframes themselves. For primary frames and/or floor structures that do support a subframe, the subframe can be non-movable or movable, the latter being commonly referred to as a slider box.

With continued reference to FIGS. 1 and 1B, axle/suspension system 10 includes a pair of generally identical suspension assemblies 14 (only one shown), each suspended from a respective one of a pair of transversely spaced frame hangers 16 (only one shown). Each hanger 16 is secured to and depends from frame 12 of the heavy-duty vehicle. Inasmuch as suspension assemblies 14 are identical to one another, only one will be described hereinbelow and shown in FIGS. 1 and 1B.

Suspension assembly 14 includes a trailing arm type suspension beam 18, which is pivotally mounted at its front end 20 on hanger 16 in a usual manner through the use of a suitable pivot and bushing assembly 22. An air spring 24 is suitably mounted on and extends between the upper surface of a rear end 26 of suspension beam 18 and frame 12. A shock absorber 2 also typically is mounted on and extends between beam 18 and hanger 16. A brake chamber mount 30 and other components of a brake system (not shown) are attached to beam 18 via the brake chamber mount. An axle 32 extends between and is captured in the pair of suspension beams 18, and one or more wheels (not shown) are mounted on each end of the axle.

Figure 1C:
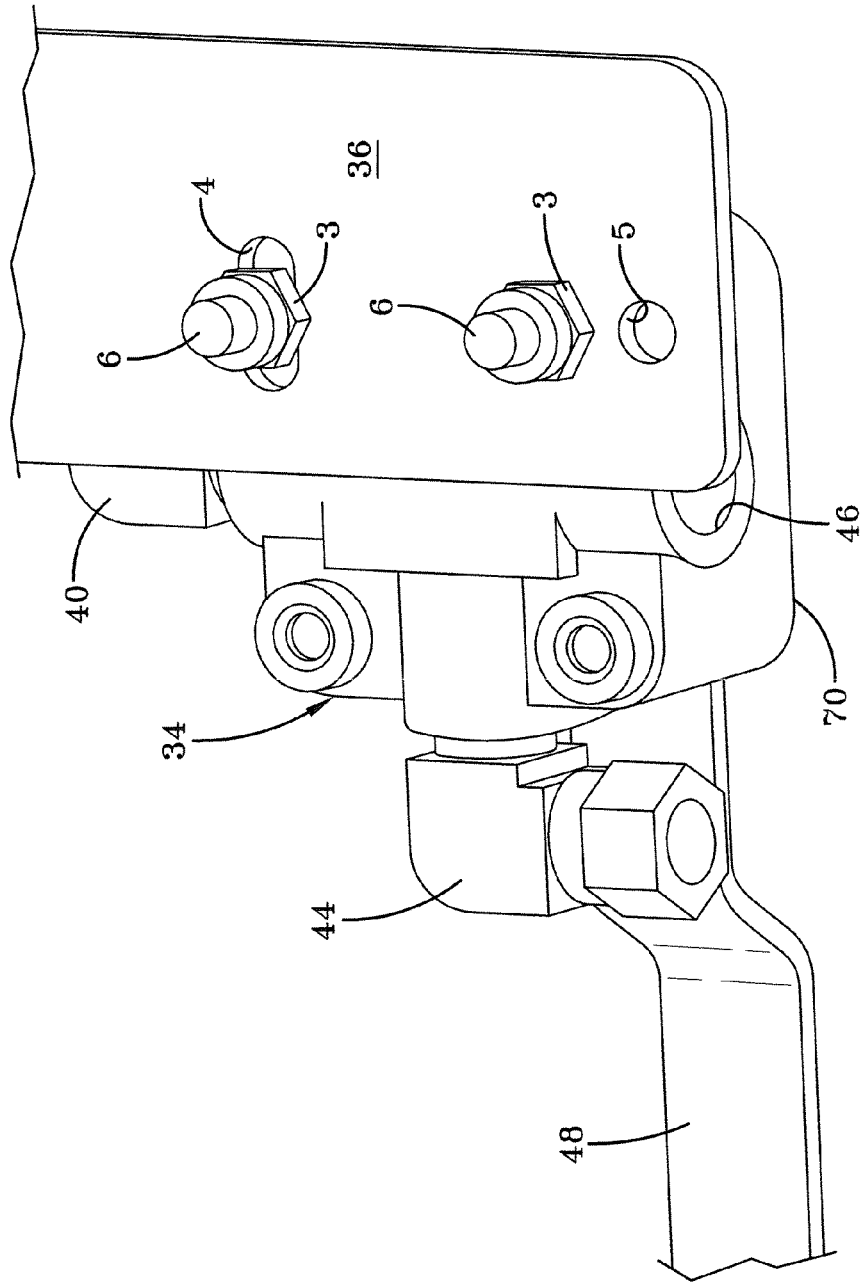
FIG. 1C is an enlarged fragmentary outboard perspective view of the frame mounting bracket shown in FIG. 1.
Figure 1D:
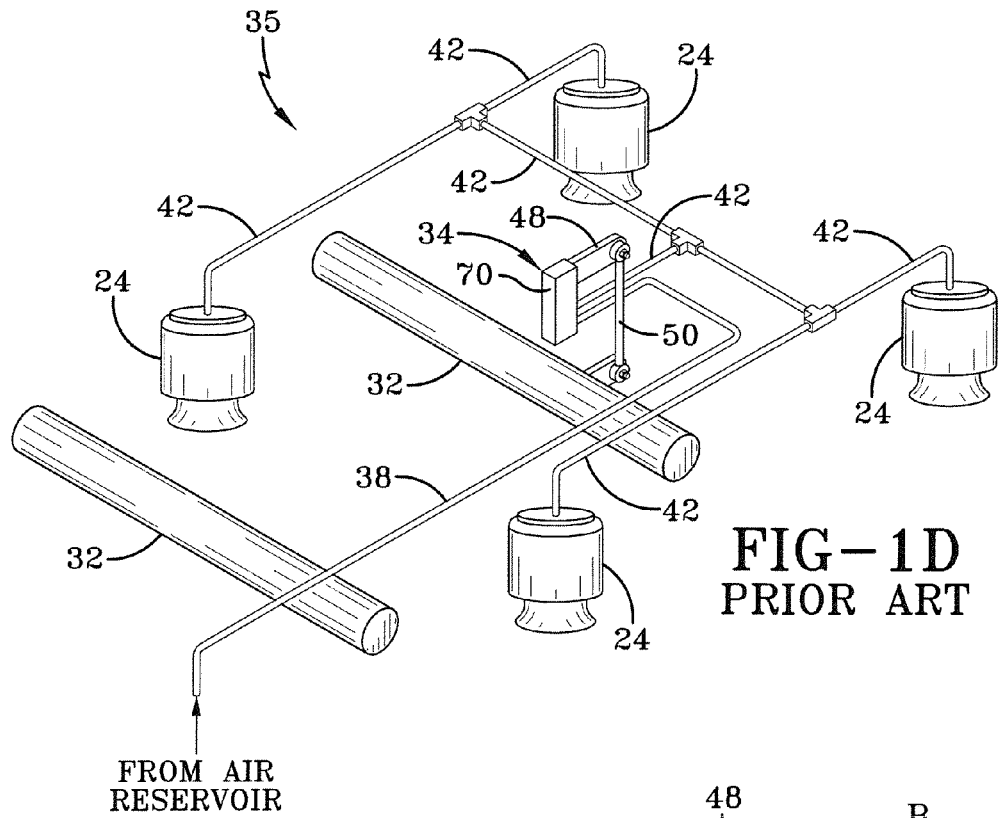
FIG. 1D is a schematic representation of a typical pneumatic control system incorporating the prior art height control valve assembly of FIG. 1, and showing relative positions of the air springs and axles of a pair of air-ride axle/suspension systems.

A typical prior art pneumatic control system, which utilizes height control valve assembly 34 such as the one shown in FIGS. 1 and 1B, is shown in FIG. 1D, is indicated generally at 35, and will be described below. Prior art height control valve assembly 34 (FIGS. 1 and 1B) includes a height control valve 70, a control arm 48, a link 50, a beam mounting bracket 54 and a frame mounting bracket 36. More particularly and with additional reference to FIG. 1C, height control valve assembly 34 is shown mounted on frame 12 (FIG. 1B) via frame mounting bracket 36. Height control valve assembly 34 is mounted on bracket 36 by bolts 6 and a pair of nuts 3. More specifically, frame mounting bracket 36 is formed with an elongated longitudinally-extending top opening 4 and a pair of circular bottom openings 5 (only one shown). Each one of a pair of threaded bolts 6 extends from height control valve 70 and is disposed through top elongated opening 4 and through one of the pair of bottom openings 5 (only one shown), respectively, and nuts 3 are threaded onto the bolts to attach the height control valve to frame mounting bracket 36. Frame link 50 is pivotally connected at its upper end to control 48 via fastener 52, and is also pivotally connected at its lower end to beam 18 via beam mounting bracket 54 and fastener 56. Link 50, includes a two-piece construction. More particularly, link 50 includes an upper portion 81 and a lower portion 82. Both upper and lower portions 81,82 include a plurality of selectively alignable openings 83. Selected ones of openings 83 of upper portion 81 and lower portion 82 are aligned with one another to enable the upper portion and the lower portion of the link to be attached to each other by fasteners 84 in order to form link 50. By moving upper portion 81 and lower portion 82 in opposite directions with respect to one another, link 50 can be lengthened or shortened, thus raising or lowering, respectively, the design ride height of the vehicle. Beam mounting bracket 54 is in turn mounted on brake chamber mount 30 by fasteners (not shown) which extend through a pair of openings 7 formed in the beam mounting bracket (FIG. 1A).

Figure 1E:
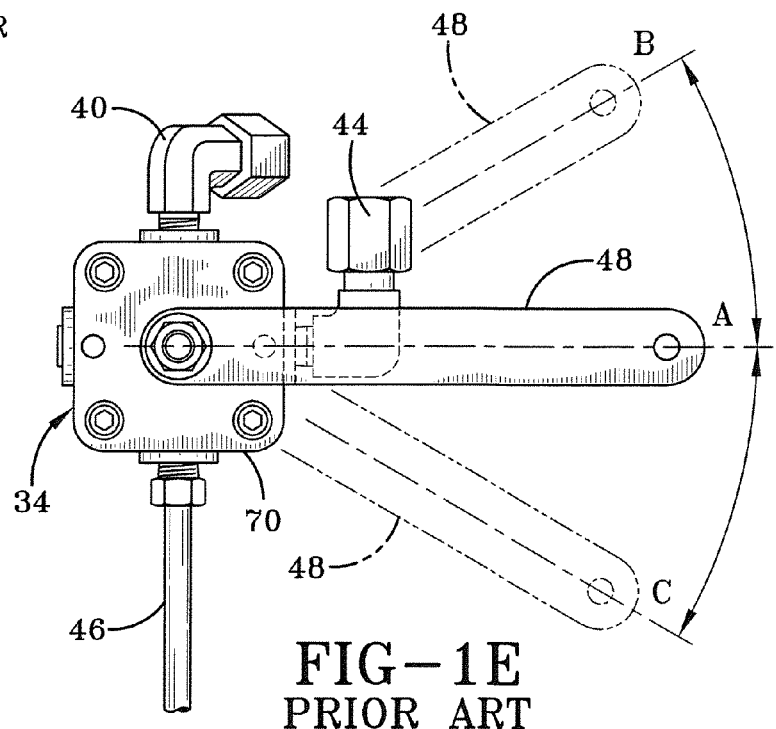
FIG. 1E is an enlarged elevational view of the height control valve of the prior art height control valve assembly shown in FIG. 1, with the range of various valve control arm positions represented by broken lines and arrows, and showing an exhaust conduit attached to the height control valve.

Turning now to FIG. 1E, pneumatic control system 35 includes an air reservoir conduit 38 which is in fluid communication with height control valve 70 via an air reservoir fitting 40, and provides compressed air to the height control valve from an air reservoir (not shown), such as an air tank, as known to those skilled in the art. With continuing reference to FIG. 1D, an air spring conduit 42 is in fluid communication with height control valve 70 via an air spring fitting 44, and the air spring conduit branches off to each of a pair of front and rear air springs 24, to enable the height control valve to route compressed air to and from the front and rear air springs based on certain operational conditions, as will be described below. An exhaust conduit 46 (FIG. 1E) is in fluid communication with and extends from height control valve 70, enabling the height control valve to exhaust compressed air to atmosphere, as will also be described in detail below. It is understood that additional pneumatic and/or electronic components (not shown) that are known and used in the art, such as electronic controllers, valves, vents and pneumatic lines, may be used in conjunction with conduits 38,42,46 and/or height control valve 70.

Referring now to FIGS. 1 and 1E, height control valve 70 is a three-way valve that includes control arm 48, wherein the position of the control arm controls the operation of the height control valve. More particularly, when control arm 48 is in a horizontal or neutral position A, height control valve 70 is closed and does not route compressed air from air reservoir conduit 38 (FIG. 1D) to air springs 24 via air spring conduits 42, nor does it exhaust air from the air springs to atmosphere via exhaust conduit 46. When control arm 48 is in fill position range B, height control valve 70 routes compressed air from air reservoir conduit 38 to air spring conduits 42 (FIG. 1D) and thus to air springs 24, thereby inflating the air springs. When control arm 48 is in an exhaust position range C, height control valve 70 exhausts air from air springs 24 via air spring conduits 42, and communicates the exhausted air to exhaust conduit 46 and thus to atmosphere. Automatic actuation of control arm 48, and thus activation of the operation of height control valve 70, is provided by control arm link 50, as shown in FIG. 1.

During vehicle operation, when axle/suspension system 10 articulates to an air spring compressed position, the distance between vehicle frame 12 and beam 18 decreases, compressing air spring 24. Because height control valve 70 is connected to vehicle frame 12, the height control valve remains a substantially constant distance from the vehicle frame. To maintain design ride height, when the distance between vehicle frame 12 and beam 18 decreases, link 50 moves control arm 48 upwardly from neutral position A to fill position range B, as shown in FIG. 1E, thereby activating height control valve 70 and causing the height control valve to route compressed air from air reservoir conduit 38 to air springs 24 via air spring conduits 42 (FIG. 1D), thereby inflating air springs 24, and in turn returning beam 18 to the design ride height.

Conversely, when axle/suspension system 10 articulates to an air spring extended position, the distance between vehicle frame 12 and beam 18 increases, extending air spring 24. To maintain ride height, when the distance between vehicle frame 12 and beam 18 increases, link 50 moves control arm 48 downwardly from neutral position A to exhaust position range C, as shown in FIG. 1E, thereby activating height control valve 70 and causing the height control valve to exhaust compressed air from air spring 24 via exhaust conduit 46 to atmosphere, and in turn returning beam 18 to the design ride height. As set forth above, prior art pneumatic control system 35 maintains the design ride height of axle/suspension system 10 when the axle/suspension system articulates during vehicle operation or during unloading/loading of the vehicle.

Figure 2:
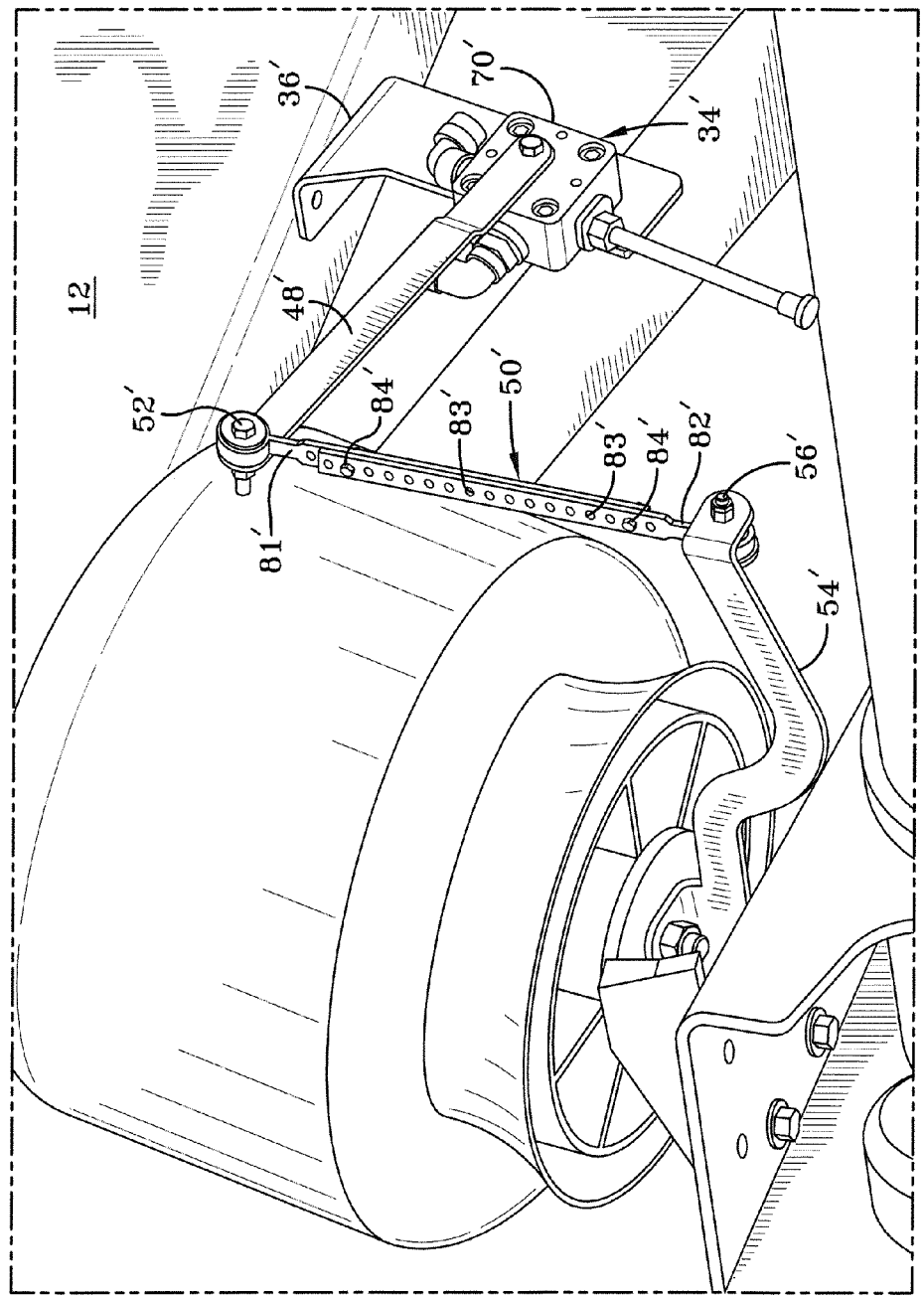
FIG. 2 is a fragmentary rear outboard perspective view of portions of the driver side suspension assembly and an axle of an air-ride trailing arm beam-type axle/suspension system, showing another prior art height control valve assembly mounted on the vehicle frame by a bracket, and also showing the relatively long control arm of the height control valve, and the link attached to the suspension assembly by a bracket.
Figure 3:
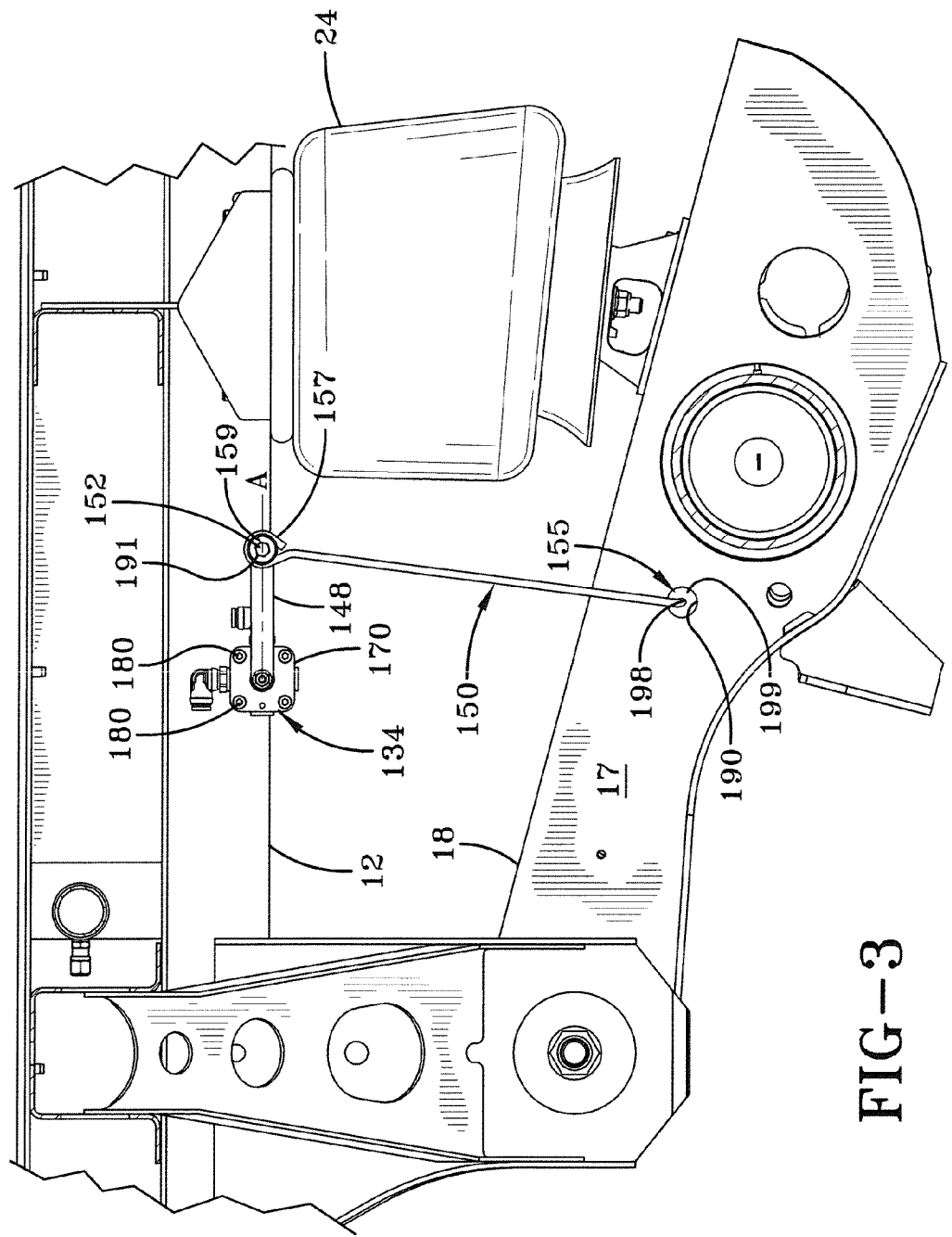
FIG. 3 is a fragmentary elevational view of a preferred embodiment height control valve assembly of the present invention, showing the shortened control arm attached to the height control valve and to the link, which is in turn attached to one of the beams of the axle/suspension system.
Figure 3A:
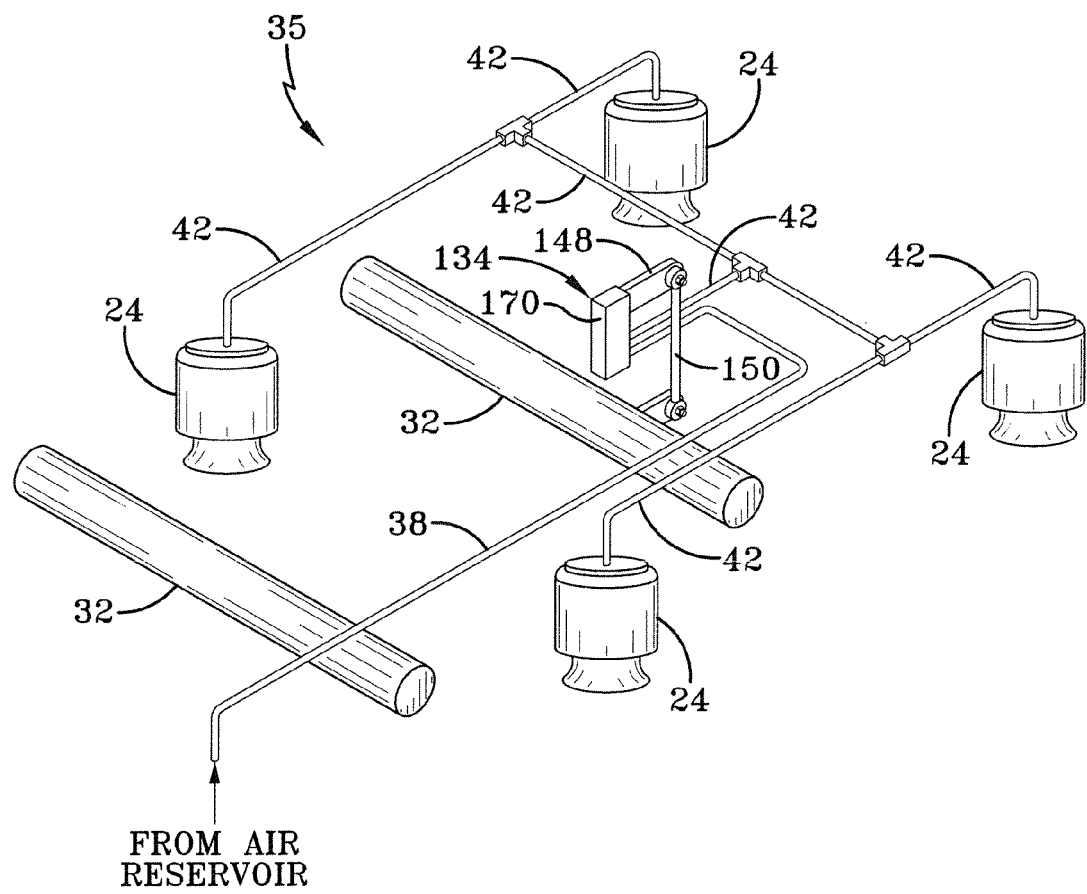
FIG. 3A is a schematic representation of a typical pneumatic control system incorporating the preferred embodiment height control valve assembly of the present invention, showing relative positions of the air springs and axles of a pair of air-ride axle/suspension systems.
Figure 4:
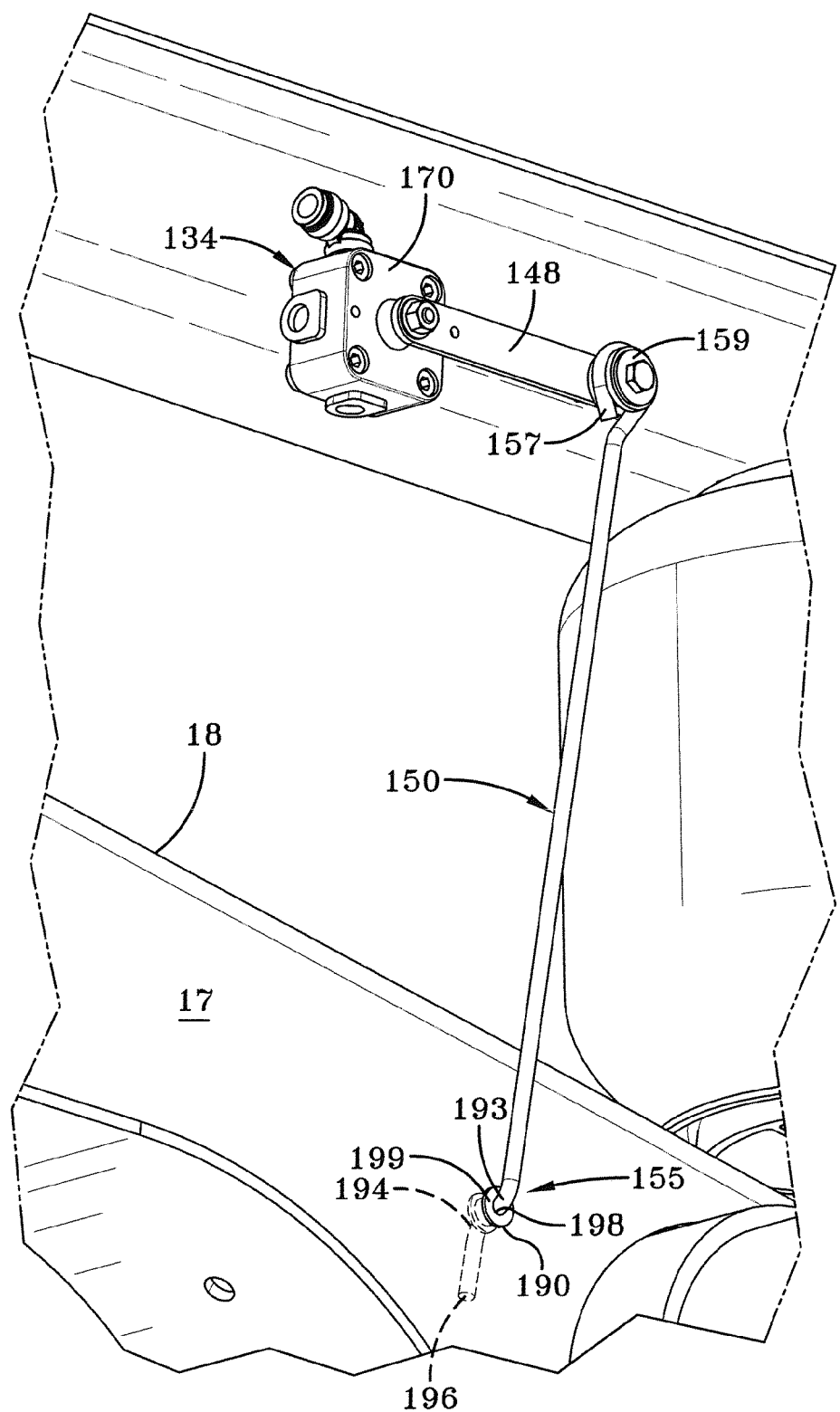
FIG. 4 is a fragmentary front bottom perspective view of the preferred embodiment height control valve assembly of the present invention shown in FIG. 3 with portions represented by broken lines, showing the link attached to the control arm of the height control valve and also pivotally seated in the opening of one of the beams of the axle/suspension system.

Turning now to FIG. 2, another prior art height control valve assembly is indicated at 34', and will now be described. More specifically, prior art height control valve assembly 34' includes height control valve 70', control arm 48', link 50', beam mounting bracket 54' and frame mounting bracket 36'. More particularly, height control valve assembly 34' is shown mounted on frame 12 of the vehicle by frame mounting bracket 36'. Link 50' is pivotally connected at its upper end to control arm 48' via fastener 52', and is also pivotally connected at its lower end to beam 18 of suspension assembly 14 via beam mounting bracket 54' and fastener 56'. Link 50', shown in FIG. 2, includes a two-piece construction. More particularly, link 50' includes an upper portion 81' and a lower portion 82'. Both upper and lower portions 81',82' include a plurality of selectively alignable openings 83'. Selected ones of openings 83' of upper portion 81' and lower portion 82' are aligned with one another to enable the upper portion and the lower portion of link 50' to be attached to each other by fasteners 84' in order to form the link. By moving upper portion 81' and lower portion 82' in opposite directions with respect to one another, link 50' can be lengthened or shortened, thus raising or lowering, respectively, the design ride height of the vehicle.

Such adjustability in both prior art height control valve assemblies is often desired by users of the heavy-duty vehicle; however, such adjustability can lead to potential problems for the heavy-duty vehicle as will be described below.

A design ride height that is too low can cause axle/suspension system 10 to bottom out during operation of the vehicle, which can in turn result in damage to the frame and/or the axle/suspension system. A design ride height that is too high can also potentially cause damage to the axle/suspension system; for example, the air spring can become over-extended causing potential damage to the air spring. Therefore, it is desirable to have a height control valve assembly that is non-adjustable in order to reduce the problems associated with adjustable height control valve assemblies that can potentially lead to a design ride height that is either too low or too high.

As set forth above, prior art height control valve assemblies 34,34' often include links 50,50' that are formed from metal plates having aligned openings 83,83'. These types of links are adjustable, which can lead to improper adjustment of the ride height of the vehicle due to human error. Also, because prior art height control valve assemblies 34,34' typically include brackets 36,36' on the vehicle frame and brackets 54,54' on the beam of the axle/suspension system that are relatively distant from one another, control arms 48,48' of the prior art height control valve assemblies are relatively long, resulting in a smaller range of activation, thereby reducing performance of the height control valve. More particularly, because height control valves 70,70' are metered, the decreased range of activation of the height control valve in turn causes decreased flow through the height control valve, thereby decreasing performance of the height control valve during operation of the vehicle. Moreover, because prior art height control valve assemblies 34,34' include at least two brackets 36,36' and 54,54', one bracket attaching the height control valve to the vehicle frame, and the other bracket attaching the link of the height control valve to one of the beams or other component mount on the beam of the axle/suspension system, the combination of brackets and adjustable or nonadjustable links make installation of the height control valve assembly complicated, require more maintenance, are heavy, and lead to an undesirable tolerance stack that can potentially cause an inaccurate ride height for the vehicle. More particularly, tolerances in openings 7 of beam mounting bracket 54 and openings 4 and 5 of frame mounting bracket 36 can result in a shift in the ride height of up to about 1.0 inch, resulting in a ride height that is either too high or too low. As set forth above, operating the vehicle with a design ride height that is either too high or too low can potentially cause damage to the components of frame 12 and/or axle/suspension system 10 of the vehicle during operation. The height control valve assembly for an axle/suspension system of the present invention overcomes the problems associated with prior art height control valve assemblies 34, and is described in detail below.

A preferred embodiment of a height control valve assembly for an axle/suspension system of the present invention is shown generally at 134 in FIGS. 3-7, and now will be described in detail below.

Height control valve assembly 134 for an axle/suspension system of the present invention includes a height control valve 170, a control arm 148 and a link 150. More particularly, height control valve 170 is shown mounted directly on vehicle frame 12 via a pair of threaded bolts 180. More specifically, bolts 180 extend through height control valve 170 and are disposed through a pair of aligned openings (not shown) formed in vehicle frame 12. A fastener (not shown), such as a nut, is threadably engaged with each bolt 180 in order to mount height control valve 170 of height control valve assembly 134 to frame 12.

Turning now to an important feature of the present invention, link 150 is pivotally connected at its upper end to control arm 148 via fastener 152, and is also pivotally connected at its lower end to beam 18 via generally Z-shaped or stepped bottom portion 155. More particularly, link 150 preferably is formed from a metal rod having a generally circular cross-sectional shape. The upper end of link 150 is formed with a loop 157. An insert 159 having a generally circular disk shape is formed with a semi-circular recess 192 (FIG. 7) around its circumference. The recess of insert 159 cooperates with loop 157 such that the insert is held within the link loop. Insert 159 is formed with an opening 191 for receipt of fastener 152 to pivotally attach the upper end of link 150 to control arm 148 of height control valve 170.

Generally Z-shaped bottom portion 155 of link 150 preferably is formed with first and second bends 193,194, respectively. A generally straight portion 197 extends between first bend 193 and second bend 194 and is generally perpendicular to a middle portion 200 of link 150. A generally straight end 196 is formed at the end of Z-shaped link bottom portion 155 and is generally parallel to middle portion 200 of link 150. In order to better understand the operation of link 150, the connection of the link to beam 18 of the axle/suspension system and to height control valve 170 now will be described below.

Straight end 196, second bend 194 and a portion of straight portion 197 of Z-shaped link bottom portion 155 are disposed through an opening 198 formed in an insert 199 that is disposed into an opening 190 formed in sidewall 17 of beam 18. Opening 191 of insert 159 is aligned with an opening (not shown) formed in control arm 148, and fastener 152 is disposed through the aligned openings to connect the upper end of link 150 to the control arm. Second bend 194 of Z-shaped link bottom portion 155 retains the bottom end of link 150 in insert opening 198 of beam 18 without additional attachment. Thus only a single fastener at the upper end of link 150 is utilized in order to connect the link to both frame 12 and beam 18 of axle/suspension system 10. This simplifies installation of height control valve assembly 134 of the present invention and makes the height control valve assembly non-adjustable.

As can be seen, a distance D between straight portion 197 and opening 191 of insert 159 sets the design ride height of the vehicle. Because the distance is not adjustable it cannot be changed. This, plus the fact that opening 198 in beam sidewall 17 as well as the location of height control valve 170 are fixed, assures that height control valve assembly 134 of the present invention is set at the desired design ride height during maintenance or installation of the assembly. Moreover, height control valve assembly 134 does not need to be adjusted by the end user, which eliminates the possibility of end user error improperly affecting the design ride height of the vehicle.

Yet another important feature of height control valve assembly 134 for axle/suspension systems of the present invention is the relatively reduced or shortened length of lever arm 148. Because height control valve 170 is attached directly to frame 12 and also directly to beam sidewall 17 via link lower Z-shaped portion 155, which are substantially vertically aligned above and below one another, without using brackets and the like, reduced length control arm 148 can be utilized and thereby increases the range of activation of height control valve 170. Because height control valve 170 is metered, the increased range of activation of the height control valve in turn increases flow through the height control valve, thereby increasing performance of the height control valve during operation of the vehicle.

Referring now to FIGS. 3, 3A, 5 and 6, height control valve 170 is a three-way valve that includes a flow control means (not shown) and a control arm 148, wherein the position of the control arm regulates the flow of fluid through the height control valve. More particularly, when control arm 148 is in a horizontal or neutral position A, height control valve 170 is closed and does not route compressed air from air reservoir conduit 38 (FIG. 3A) to air springs 24 via air spring conduits 42, nor does it exhaust air from the air springs to atmosphere via exhaust conduit 46. When control arm 148 is in fill position range B (FIG. 6), height control valve 170 routes compressed air from air reservoir conduit 38 to air spring conduits 42 (FIG. 3A) and thus to air springs 24, thereby inflating the air springs. When control arm 148 is in an exhaust position range C (FIG. 5), height control valve 170 exhausts air from air springs 24 via air spring conduits 42, and communicates the exhausted air to the exhaust conduit (not shown) and thus to atmosphere. Automatic actuation of control arm 148, and thus activation of the operation of height control valve 170, is provided by control arm link 150.

Figure 6:
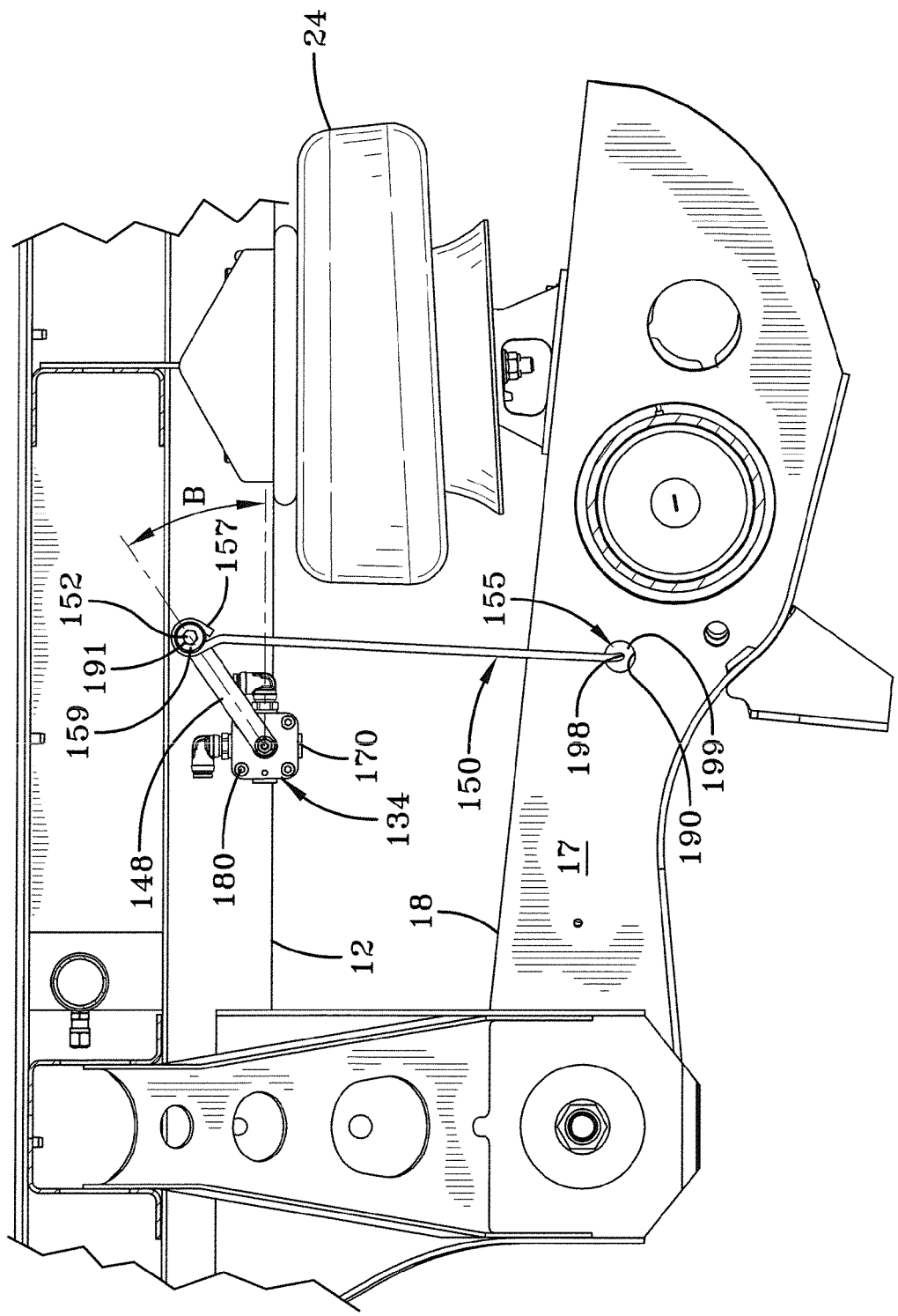
FIG. 6 is a view similar to FIG. 3, but showing the control arm of the height control valve in a fill position when the axle/suspension system is in a compressed or jounce position.
Figure 7:
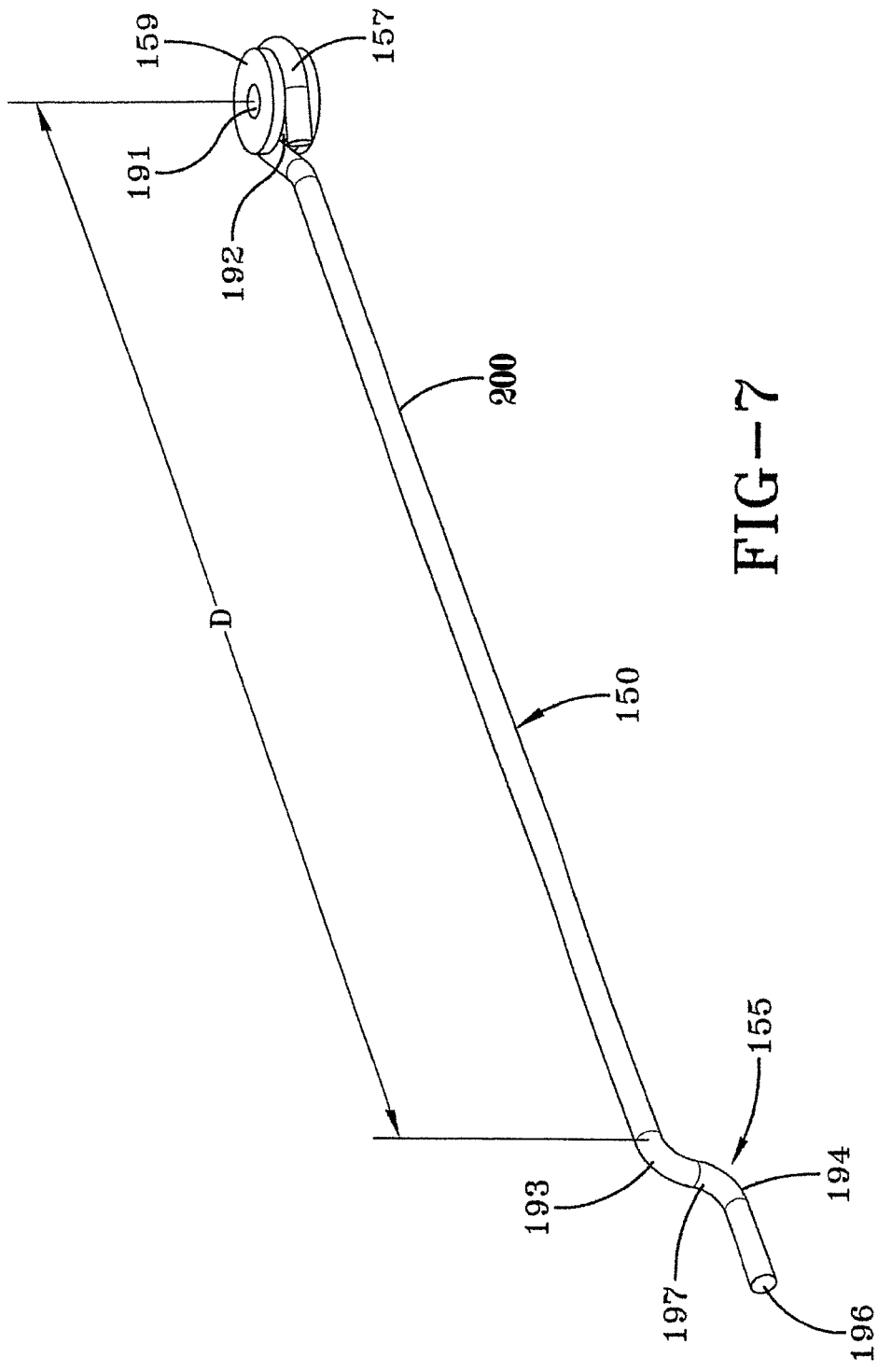
FIG. 7 is a perspective view of the link of the preferred embodiment height control valve assembly of the present invention, and showing the control arm mount and the generally Z-shaped beam mount of the link.

During vehicle operation, when axle/suspension system 10 articulates to an air spring compressed position (FIG. 6), the distance between vehicle frame 12 and beam 18 decreases, compressing air spring 24. Because height control valve 170 is connected to vehicle frame 12, the height control valve remains a substantially constant distance from the vehicle frame. To maintain design ride height, when the distance between vehicle frame 12 and beam 18 decreases, link 150 moves control arm 148 upwardly from neutral position A to fill position range B, as shown in FIG. 6, thereby activating height control valve 170 and causing the height control valve to route compressed air from air reservoir conduit 38 to air springs 24 via air spring conduits 42 (FIG. 3A), thereby inflating air springs 24, and in turn returning beam 18 to the design ride height.

Figure 5:
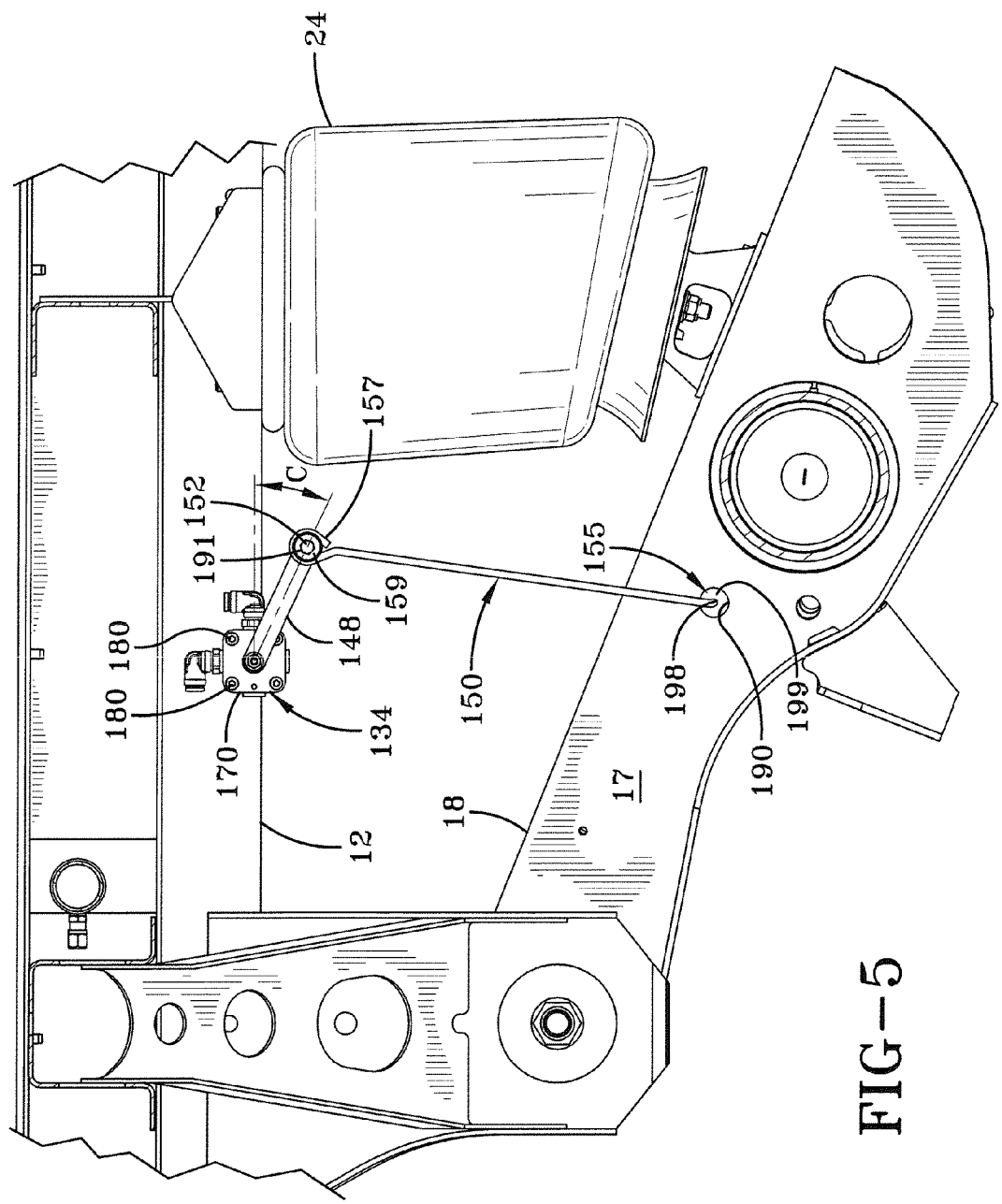
FIG. 5 is a view similar to FIG. 3, but showing the control arm of the height control valve in an exhaust position when the axle/suspension system is in an extended or rebound position.

Conversely, when axle/suspension system 10 articulates to an air spring extended position (FIG. 5), the distance between vehicle frame 12 and beam 18 increases, extending air spring 24. To maintain ride height, when the distance between vehicle frame 12 and beam 18 increases, link 150 moves control arm 148 downwardly from neutral position A to exhaust position range C, as shown in FIG. 5, thereby activating height control valve 170 and causing the height control valve to exhaust compressed air from air spring 24 via exhaust conduit 46 (FIG. 3A) to atmosphere, and in turn returning beam 18 to the design ride height.

The problems associated with prior art height control valve assemblies 34 are solved by height control valve assembly 134 for an axle/suspension system of the present invention by utilizing height control valve 170 that mounts directly to vehicle frame 12 and which utilizes a non-adjustable wire link 150 that attaches directly to beam 18 of the axle/suspension system. This direct attachment of link 150 directly to beam 18 is accomplished without fasteners using link Z-shaped lower portion 155 disposed through opening 198 formed in beam sidewall 17, thereby eliminating all of the brackets and associated hardware of prior art height control valve assemblies 34 shown and described above, resulting in reduced weight, easier installation and decreased maintenance costs, as well as reducing undesirable tolerance stacks associated with the multiple bracket configurations of prior art height control valve assemblies. Height control valve assembly 134 of the present invention, because it is generally non-adjustable, reduces the possibility of end user error affecting the design ride height of the vehicle and allows for utilization of shorter control arm 148, that in turn allows a wider range of activation for the height control valve, which in turn increases the sensitivity and performance of the system.

It is contemplated that height control valve assembly 134 for axle/suspension systems of the present invention could be utilized in conjunction with all types of height control valves known in the art, without changing the overall concept or operation of the present invention. It is also contemplated that different shapes and sizes of link 150 and Z-shaped lower portion 155 of height control valve assembly 134 of the present invention could be utilized, without changing the overall concept or operation of the present invention. It is contemplated that materials other than metal or wire could be utilized to form link 150, without changing the overall concept or operation of the present invention. It is also contemplated that other types of connection means for connecting link 150 to control 148 could be utilized, without changing the overall concept or operation of the present invention. It is further contemplated that height control valve assembly 134 for axle/suspension systems of the present invention could be utilized with all types of air-ride axle/suspension systems known in the art, including those utilizing spring beams or other beam configurations, without changing the overall concept or operation of the present invention. It is also contemplated that height control valve assembly 134 for axle/suspension systems of the present invention could be utilized in conjunction with all known types of pneumatic systems, without changing the overall concept or operation of the present invention. It is further contemplated that height control valve assembly 134 for axle/suspension systems of the present invention could be utilized with additional pneumatic and/or electronic components (not shown) that are known and used in the art, such as electronic controllers, valves, vents and pneumatic lines, without changing the overall concept or operation of the present invention.

Accordingly, the height control valve assembly of the present invention is simplified, provides an effective, safe, inexpensive and efficient structure and method which achieves all the enumerated objectives, provides for eliminating difficulties encountered with prior height control valve assemblies, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the height control valve assembly of the present invention is used and installed, the characteristics of the construction, arrangement and method steps, and the advantageous, new and useful results obtained; the new and useful structures, devices, elements, arrangements, process, parts and combinations are set forth in the appended claims.

What is claimed is:

1. A height control valve assembly for an suspension system of a vehicle comprising:
   a) a height control valve mounted on a frame of said vehicle, said height control valve in fluid communication with a compressed air source, with at least one air spring of said vehicle, and with atmosphere, the height control valve including flow control means for regulating fluid flow through said height control valve, a control arm having first and second ends operatively attached to said flow control means, said control arm regulating fluid flow through the height control valve during operation of the vehicle,
   b) a link having a first end and a second end, said first end of said link being formed with a loop, a disk formed with an opening being disposed into said loop of the link, the first end of the link being operatively attached to the second end of the control arm via a fastener disposed through said disk opening and through an opening formed in said control arm second end, said disk attached to said second end of said control arm opposite the first end of the control arm operatively attached to said height control valve, said second end of said link comprising a first bend of about 90 degrees and a second bend of about 90 degrees, at least one of said first or second bends being disposed through an opening formed in a beam of said suspension system to attach the second end of the link to the beam, wherein said second end of said link is free of fasteners and any intervening structure.

2. The height control valve assembly for an suspension system of claim 1, wherein said first and second ends of said link are generally vertically aligned with one another.

3. The height control valve assembly for an suspension system of claim 1, wherein said attachment of said height control valve to said frame of said vehicle is free of any intervening structure.

4. The height control valve assembly for an suspension system of a vehicle of claim 1, wherein said suspension system is an air-ride beam suspension system.

5. The height control valve assembly for an suspension system of a vehicle of claim 1, wherein said height control valve is a rotor valve.

6. The height control valve assembly for an suspension system of a vehicle of claim 1, wherein said link is formed from metal.

7. The height control valve assembly for an suspension system of a vehicle of claim 1, wherein said link is generally circular in transverse cross-section.

* * * * *